United States Patent Office 3,111,530
Patented Nov. 19, 1963

3,111,530
PROCESS FOR PREPARING CHLOROMETHYL 5-NITRO-2-FURYL KETONE
Gabriel Gever, Norwich, N.Y., assignor to The Norwich Pharmacal Company, a corporation of New York
No Drawing. Filed Aug. 27, 1962, Ser. No. 219,731
1 Claim. (Cl. 260—347.8)

This invention relates to an improved process for preparing chloromethyl 5-nitro-2-furyl ketone. Like many nitrofurans, this compound is a disinfactant and antiseptic. It is also useful as an intermediate in the preparation of other nitrofuran compounds.

Heretofore, the preparation of chloromethyl 5-nitro-2-furyl ketone has best been accomplished by a synthesis which involves the use of 5-nitro-2-furoyl chloride and diazomethane. Both of these compounds have extremely hazardous propensities requiring the exercise of great caution in their use. While the yield of the desired end product is satisfactory using these reactments, their highly toxic character, especially that if diazomethane, makes production on a large scale nearly out of the question in a practical sense.

It has now been found that chloromethyl 5-nitro-2-furyl ketone can be produced in simple and facile fashion and in high yield using reactants which are commonly handled with relative ease and which do not have the insidious toxicity of those used in the past.

In accordance with this invention, chloromethyl 5-nitro-2-furyl ketone is produced readily and cheaply by simply bringing together bromomethyl 5-nitro-2-furyl ketone and hydrochloric acid.

In the practice of this invention bromomethyl 5-nitro-2-furyl ketone is merely suspended in concentrated hydrochloric acid for a short time and chloromethyl 5-nitro-2-furyl ketone recovered from the mixture. The reaction is simply illustrated:

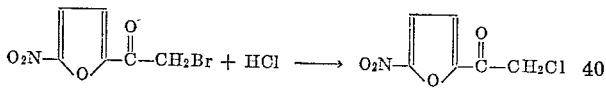

It is conveniently conducted by mixing bromomethyl 5-nitro-2-furyl ketone and concentrated hydrochloric acid in a suitable reaction vessel, supplying heat briefly to said vessel until the mixture becomes clear, cooling and filtering to recover chloromethyl 5-nitro-2-furyl ketone. A temperature of about 80° for about 10 minutes serves to readily promote the reaction and produce a high yield of the product. The chloromethyl 5-nitro-2-furyl ketone may be purified by recrystallizing from a suitable solvent such as carbon tetrachloride.

In order that this improved process may be readily available to and understood by those skilled in the art, a brief description of a preferred embodiment of it is supplied:

A mixture of 5 g. of bromomethyl 5-nitro-2-furyl ketone and 125 cc. of concentrated hydrochloric acid in a flask is heated on a steam bath at about 80° with stirring for about 10 minutes. A clear solution is obtained. The solution is cooled in ice, filtered, and the solid obtained washed with cold water. The yield is 2.4 g. of chloromethyl 5-nitro-2-furyl ketone, M.P. 90–93°. The filtrate and the washings are made up to 250 cc. with cold water and allowed to stand in an ice bath for ½ hour. This is filtered, and the solid obtained washed with cold water to yield an additional 0.6 g. of chloromethyl 5-nitro-2-furyl ketone, M.P. 89–92°. The 3 g. of solid are recrystallized from 100 cc. of carbon tetrachloride to give 2.4 g., 60% overall yield of chloromethyl 5-nitro-2-furyl ketone, M.P. 96–97°.

What is claimed is:
A process for preparing chloromethyl 5-nitro-2-furyl ketone which comprises bringing together bromomethyl 5-nitro-2-furyl ketone and concentrated hydrochloric acid.

No references cited.